(12) United States Patent
Lanner

(10) Patent No.: US 10,058,465 B1
(45) Date of Patent: Aug. 28, 2018

(54) HOOD-MOUNTED STRETCHER FOR USE WITH A VEHICLE

(71) Applicant: Michael Lanner, Miami Beach, FL (US)

(72) Inventor: Michael Lanner, Miami Beach, FL (US)

( * ) Notice: Subject to any disclaimer, the term of this patent is extended or adjusted under 35 U.S.C. 154(b) by 210 days.

(21) Appl. No.: 15/231,952

(22) Filed: Aug. 9, 2016

(51) Int. Cl.
*B60R 9/06* (2006.01)
*A61G 1/06* (2006.01)
*A61G 3/08* (2006.01)
*E01F 13/02* (2006.01)
*B60R 11/00* (2006.01)

(52) U.S. Cl.
CPC ......... *A61G 3/0875* (2013.01); *A61G 3/0858* (2013.01); *B60R 9/065* (2013.01); *E01F 13/022* (2013.01); *E01F 13/028* (2013.01); *A61G 1/06* (2013.01); *A61G 3/0833* (2013.01); *B60R 2011/0059* (2013.01)

(58) Field of Classification Search
CPC ... B60R 9/065; B60R 2011/0059; A61G 1/06; A61G 3/0833; A61G 1/013; A61G 3/0875
USPC .................................................. 224/309, 328
See application file for complete search history.

(56) References Cited

U.S. PATENT DOCUMENTS

| 1,402,846 | A |   | 1/1922 | Dubee |  |
|---|---|---|---|---|---|
| 3,565,305 | A | * | 2/1971 | Belokin, Jr. | B60R 9/065 |
|  |  |  |  |  | 190/109 |
| 4,050,614 | A | * | 9/1977 | Simpson | B60R 9/065 |
|  |  |  |  |  | 224/29.5 |
| 4,483,471 | A | * | 11/1984 | Prosen | B60R 9/00 |
|  |  |  |  |  | 224/309 |
| 4,779,779 | A | * | 10/1988 | Haugland | B60R 9/065 |
|  |  |  |  |  | 224/318 |
| 4,953,909 | A |   | 9/1990 | Crane |  |
| 5,573,162 | A | * | 11/1996 | Spencer | B62J 9/00 |
|  |  |  |  |  | 224/401 |
| 5,620,123 | A |   | 4/1997 | Brisbois |  |
| 5,806,736 | A |   | 9/1998 | Kincart |  |
| 5,985,382 | A |   | 11/1999 | Shuen |  |
| 6,145,719 | A | * | 11/2000 | Robert | B60R 7/14 |
|  |  |  |  |  | 224/319 |
| 6,209,941 | B1 | * | 4/2001 | Cross | B62J 9/00 |
|  |  |  |  |  | 224/426 |
| 6,257,470 | B1 | * | 7/2001 | Schaefer | B60R 9/055 |
|  |  |  |  |  | 224/318 |
| 6,401,994 | B1 | * | 6/2002 | Ham | B60R 7/14 |
|  |  |  |  |  | 109/51 |

(Continued)

FOREIGN PATENT DOCUMENTS

CN 204072520 U 1/2015

*Primary Examiner* — Justin Larson
(74) *Attorney, Agent, or Firm* — Kyle A. Fletcher, Esq.

(57) ABSTRACT

The hood-mounted stretcher for use with a vehicle is an apparatus that is adapted for use with vehicles. The hood-mounted stretcher for use with a vehicle is further adapted for use with a stretcher. The hood-mounted stretcher for use with a vehicle is intended for use by emergency personnel to allow a stretcher to be secured to the hood of a vehicle such that a person can be transported by stretcher using the vehicle. The hood-mounted stretcher for use with a vehicle comprises a stretcher, a container, a lid, a plurality of anchors, a plurality of webbings, and a plurality of strain devices.

20 Claims, 7 Drawing Sheets

(56) References Cited

U.S. PATENT DOCUMENTS

| | | | | |
|---|---|---|---|---|
| 6,425,510 B1 * | 7/2002 | King | ................ | B60R 9/065 |
| | | | | 224/401 |
| 6,892,912 B1 * | 5/2005 | MacNeil | ................ | B60R 9/055 |
| | | | | 224/318 |
| 7,004,365 B2 * | 2/2006 | Ingram | ................ | B60R 7/14 |
| | | | | 220/23.91 |
| 7,043,785 B2 * | 5/2006 | Dimentmen | ................ | A61G 1/013 |
| | | | | 5/111 |
| 7,188,880 B1 * | 3/2007 | Frieder | ................ | A61G 1/06 |
| | | | | 296/19 |
| 7,258,516 B1 * | 8/2007 | Collins | ................ | B60P 7/0807 |
| | | | | 410/99 |
| D642,113 S | 7/2011 | Farber | | |
| 8,087,112 B2 * | 1/2012 | Cahaan | ................ | A61G 1/013 |
| | | | | 280/47.25 |
| 9,399,434 B2 * | 7/2016 | Kennedy | ................ | B60R 11/06 |
| 2009/0260159 A1 * | 10/2009 | Buchanan | ................ | A61G 1/013 |
| | | | | 5/617 |
| 2015/0052682 A1 * | 2/2015 | Biswell | ................ | A61G 1/013 |
| | | | | 5/627 |

\* cited by examiner

HOOD-MOUNTED STRETCHER FOR USE WITH A VEHICLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transporting medical patients and vehicles with special provisions for transporting patients, more specifically, an accessory adapted for use with vehicles to facilitate the transport of patients.

SUMMARY OF INVENTION

The hood-mounted stretcher for use with a vehicle is an apparatus that is adapted for use with vehicles. The hood-mounted stretcher for use with a vehicle is further adapted for use with a stretcher. The hood-mounted stretcher for use with a vehicle is intended for use by emergency personnel to allow a stretcher to be secured to the hood of a vehicle such that a person can be transported by stretcher using the vehicle.

It is an object of the invention to provide a hood-mounted stretcher that is able to be affixed atop of a hood of a vehicle.

It is a further object of the invention to provide a container that works in concert with or in lieu of the hood-mounted stretcher in order to provide a place to contain items adjacent a hood of a respective vehicle.

It is a further object of the invention for the hood-mounted stretcher to be affixed on top of or adjacent to the container.

It is a further object of the invention for hardware of the invention to be used to support a rope for formation of a vehicle and personnel barricade.

These together with additional objects, features and advantages of the hood-mounted stretcher for use with a vehicle will be readily apparent to those of ordinary skill in the art upon reading the following detailed description of the presently preferred, but nonetheless illustrative, embodiments when taken in conjunction with the accompanying drawings.

In this respect, before explaining the current embodiments of the hood-mounted stretcher for use with a vehicle in detail, it is to be understood that the hood-mounted stretcher for use with a vehicle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the hood-mounted stretcher for use with a vehicle.

It is therefore important that the claims be regarded as including such equivalent construction insofar as they do not depart from the spirit and scope of the hood-mounted stretcher for use with a vehicle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
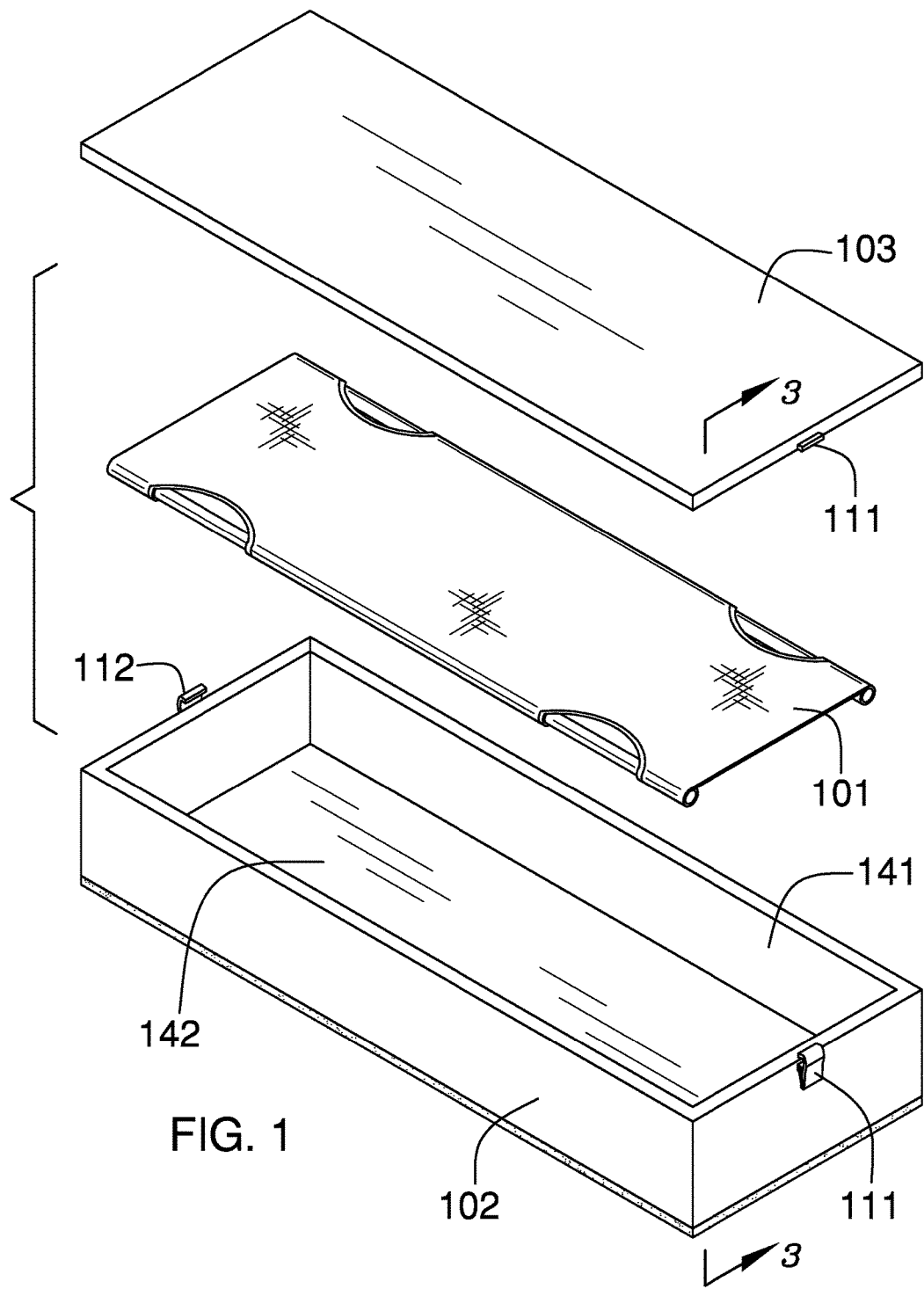
FIG. 1 is a perspective view of an embodiment of the disclosure.
Figure 2:
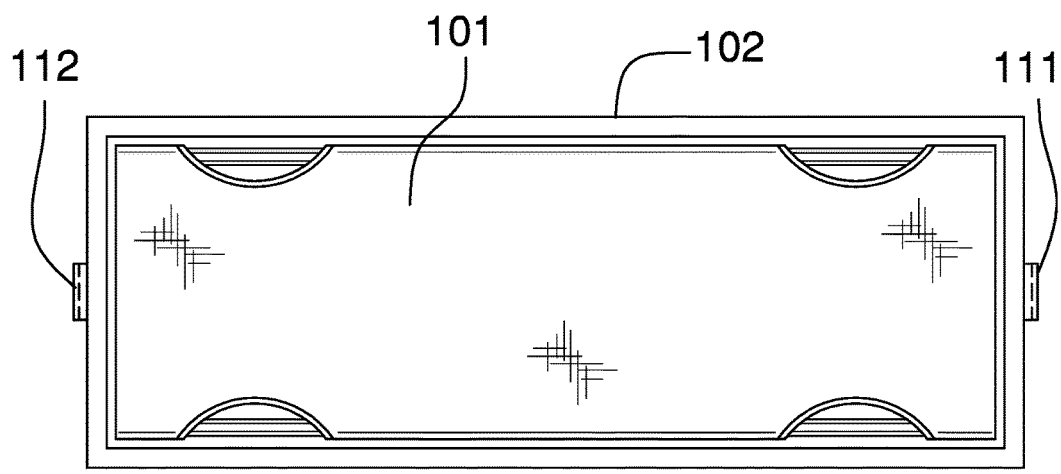
FIG. 2 is a top view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 8.

The hood-mounted stretcher for use with a vehicle 100 (hereinafter invention) comprises a stretcher 101, a container 102, a lid 103, a plurality of anchors 104, a plurality of webbings 105, and a plurality of strain devices 106. The invention 100 is an apparatus that is adapted for use with a vehicle 131. The invention 100 is further adapted for use with a stretcher 101. The invention 100 is intended for use by emergency personnel to allow a stretcher 101 to be secured to the hood 132 of a vehicle 131 such that a person can be transported by stretcher 101 using the vehicle 131.

The stretcher 101 is a readily and commercially available stretcher 101 that is used for the transport of patients.

The container 102 is a hollow rectangular structure that is sized to receive one or more stretchers 101 for storage purposes when not in use. In the first potential embodiment of the disclosure, the container 102 is formed from a polycarbonate resin to provide bullet resistance to the container 102 such that the container 102 itself can be used as a shield in emergency situations. The container 102 further comprises an open surface 141 that allows access into the interior chamber 142 of the container 102.

Figure 3:
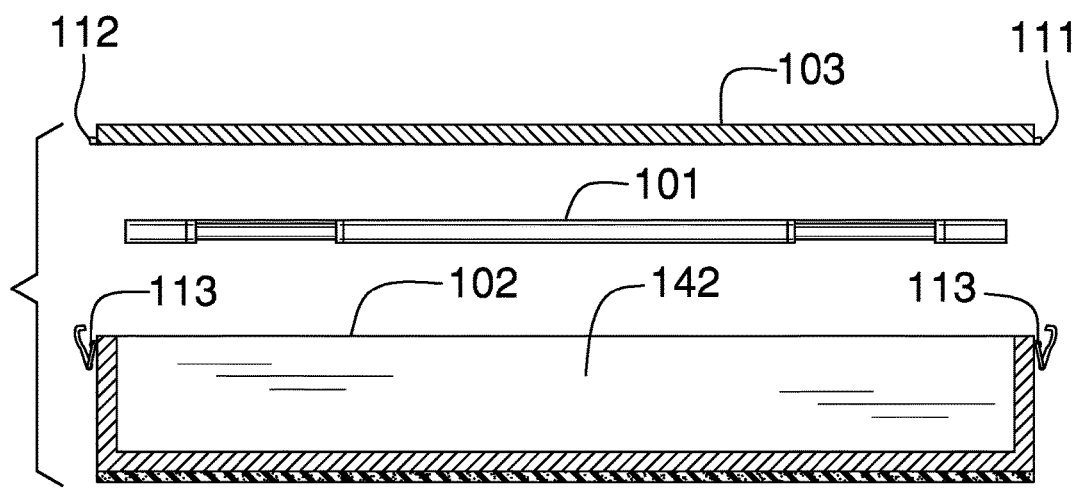
FIG. 3 is a cross-sectional view of an embodiment of the disclosure across 3-3 as shown on FIG. 1.

The lid 103 is a rectangular plate that is sized to cover and close the open surface 141 of the container 102. In the first potential embodiment of the disclosure, the lid 103 is formed from the same bullet resistant material as the container 102. As shown in FIGS. 1 and 3, the lid 103 is attached to the container 102 using a first locking fastener 111 and a second locking fastener 112. The first locking fastener 111 and the second locking fastener 112 are identical. The first locking fastener 111 and the second locking fastener 112 are commercially available fasteners that have a mechanism that positively secures the attachment of the first element to the second element of each fastener such that this positive attachment cannot work loose as a result of vibration or other forces. As shown most clearly in FIG. 3, in the first potential embodiment of the disclosure, a wire mechanism 113 is used to provide the positive attachment.

The purpose of the plurality of anchors 104 is to provide a plurality of secure anchor points to which the container 102 can be attached such that the container 102 will not shift during transport. Each of the plurality of anchors 104 is a mooring device that is fastened to the hood 132 of the vehicle 131 such that each of the plurality of webbings 105 can be fastened to one or more anchors selected from the plurality of anchors 104. The plurality of webbings 105 are discussed elsewhere in this disclosure.

The plurality of webbings 105 is a collection of individual webbings that are used to: 1) secure the container 102 to the hood 132 of the vehicle 131; and, 2) support the stretcher 101 when the stretcher 101 is placed on the container 102. As shown most clearly in FIG. 5, each webbing selected from the plurality of webbings 105 is looped through two anchors selected from the plurality of anchors 104. The each webbing selected from the plurality of webbings 105 is further placed on the container 102 such that the container 102 is between each webbing selected from the plurality of webbings 105 and the hood of the vehicle 131. Each of the two ends of each webbing selected from the plurality of webbings 105 are attached to each other using a strain device selected from the plurality of strain devices 106. The purpose of each the each strain device selected from the plurality of strain devices 106 is to: 1) attach the two ends of a webbing selected from the plurality of webbings 105 to each other; and, 2) to place each webbing selected from the plurality of webbings 105 under tension such that each of the plurality of webbings 105 will support the stretcher 101 when the stretcher 101 is placed on the container 102.

Figure 4:
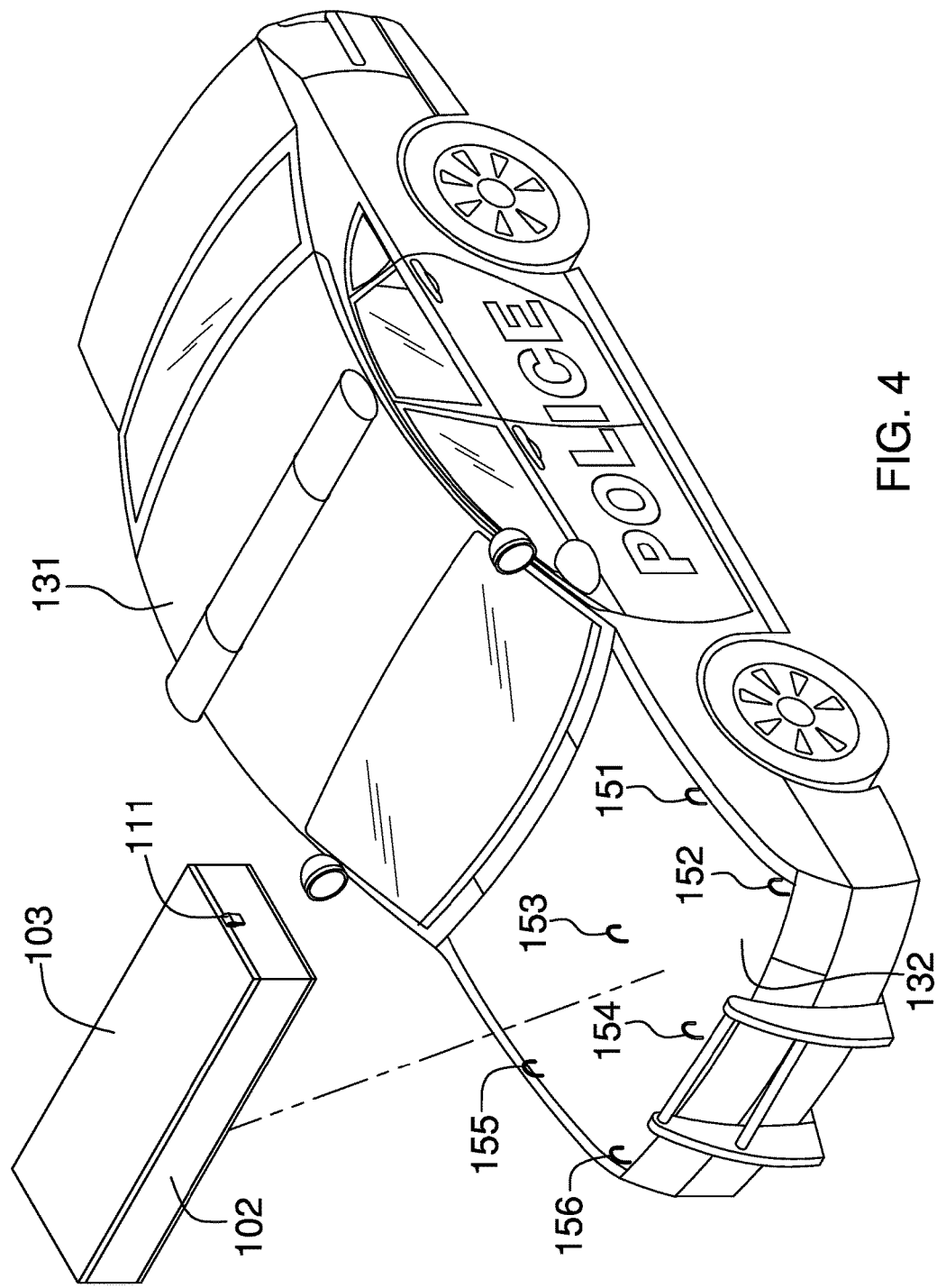
FIG. 4 is an exploded view of an embodiment of the disclosure.
Figure 5:
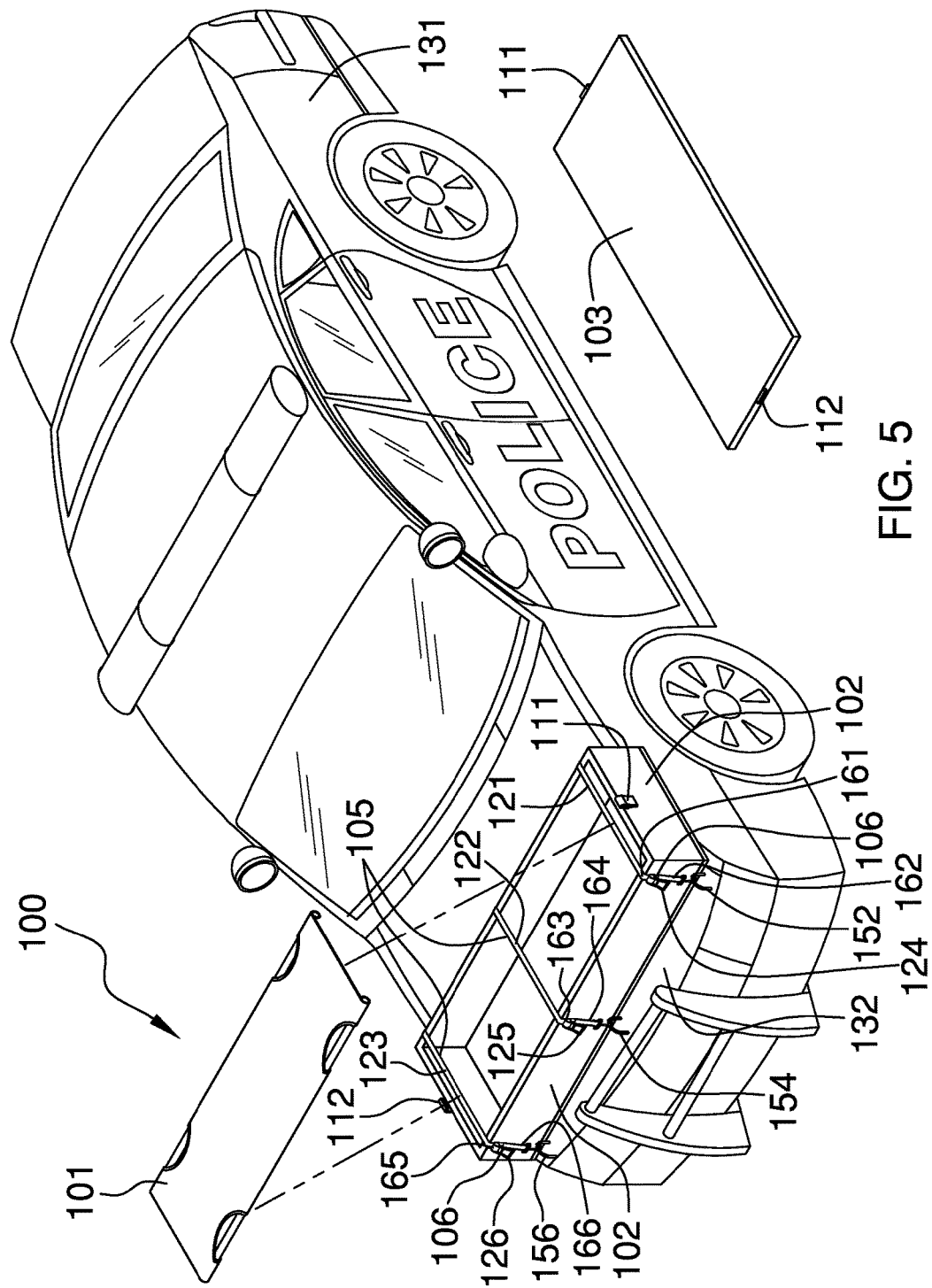
FIG. 5 is another exploded view of an embodiment of the disclosure.

As shown most clearly in FIGS. 4 and 5, in the first potential embodiment of the disclosure, each of the plurality of anchors 104 is a readily and commercially available U bolt that is either welded or bolted to the hood 132 of the vehicle 131. The plurality of anchors 104 further comprises a first U bolt 151, a second U bolt 152, a third U bolt 153, a fourth U bolt 154, a fifth U bolt 155, and a sixth U bolt 156. The plurality of webbings 105 further comprises a first webbing 121, a second webbing 122, and a third webbing 123. The first webbing 121 is further defined with a first end 161 and a second end 162. The second webbing 122 is further defined with a third end 163 and a fourth end 164. The third webbing 123 is further defined with a fifth end 165 and a sixth end 166. Each of the plurality of strain devices 106 is a readily and commercially available quick release buckle with an associated ring and slider arrangement. Methods to use quick release buckles and ring and slider arrangements are well known and documented in the textile arts.

The plurality of strain devices 106 further comprises a first strain device 124, a second strain device 125 and a third strain device 126. To secure the first potential embodiment of the disclosure to a vehicle 131, the container 102 is placed on top of the hood 132 of the vehicle 131. The first webbing 121 is threaded through the first U bolt 151 and the second U bolt 152 and placed on top of the container 102. The first end 161 and the second end 162 are then joined using the first strain device 124 and tension is applied to the first webbing 121. The second webbing 122 is threaded through the third U bolt 153 and the fourth U bolt 154 and placed on top of the container 102. The third end 163 and the fourth end 164 are then joined using the second strain device 125 and tension is applied to the second webbing 122. The third webbing 123 is threaded through the fifth U bolt 155 and the sixth U bolt 156 and placed on top of the container 102. The fifth end 165 and the sixth end 166 are then joined using the third strain device 126 and tension is applied to the third webbing 123. The stretcher 101 is then placed on top of the container 102 such that it is supported by the first webbing 121, the second webbing 122, and the third webbing 123. The lid 103 is stored within the vehicle 131 during transport.

Figure 6:
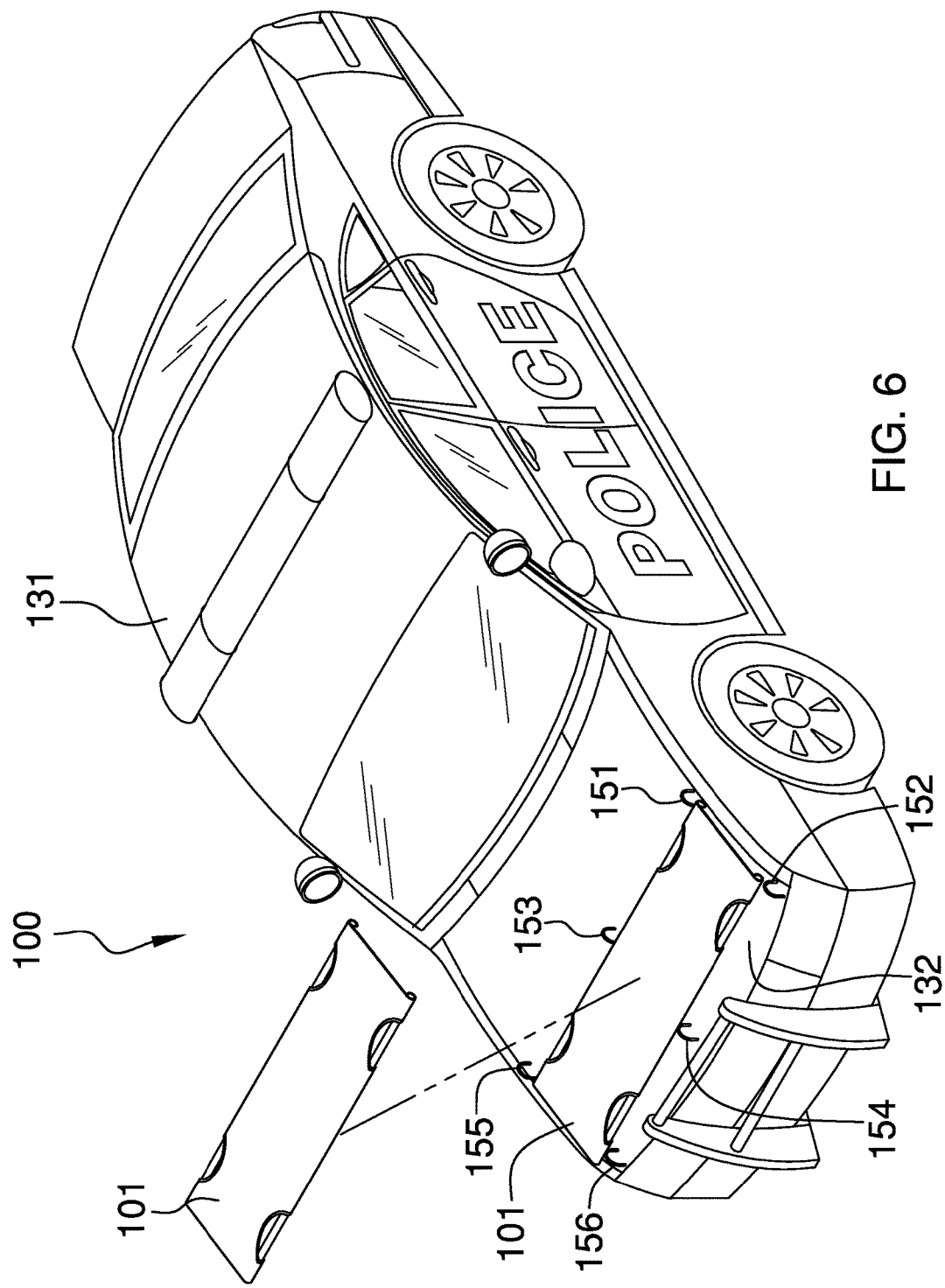
FIG. 6 is a view of an alternative embodiment of the disclosure.

Referring to FIG. 6, an alternative embodiment of the invention 100 simply affixes the stretcher to the hood 132 of the vehicle 131. This embodiment of the invention 100 is in lieu of the container 102.

Figure 7:
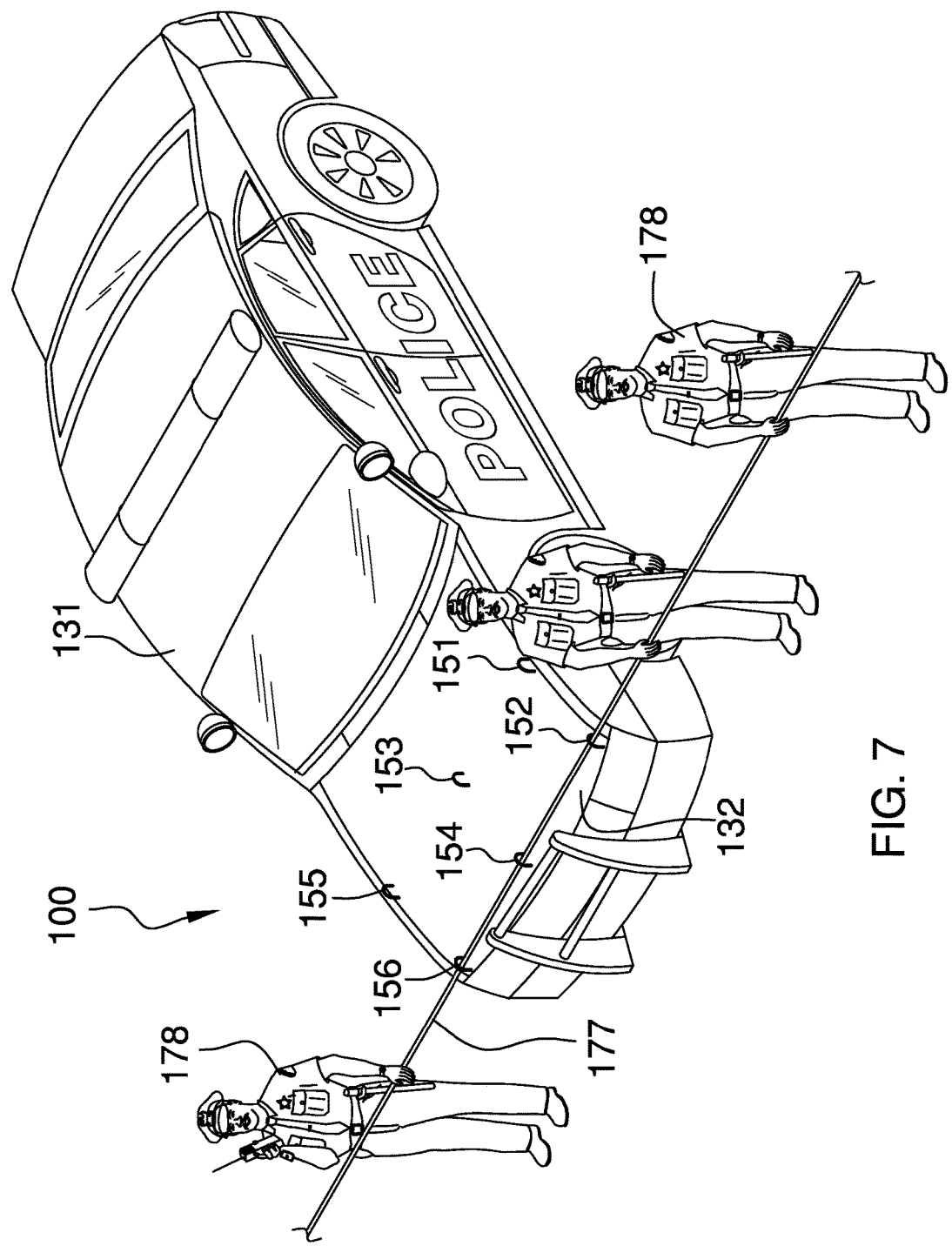
FIG. 7 is a view of another alternative embodiment of the disclosure in use.

Referring to FIG. 7, another alternative embodiment of the invention 100 uses a rope 177 that extends across the second U bolt 152, the fourth U bolt 154, and the sixth U bolt 156. The rope 177 forms a barricade that is adapted to be supported via the vehicle 131 and personnel 178.

Figure 8:
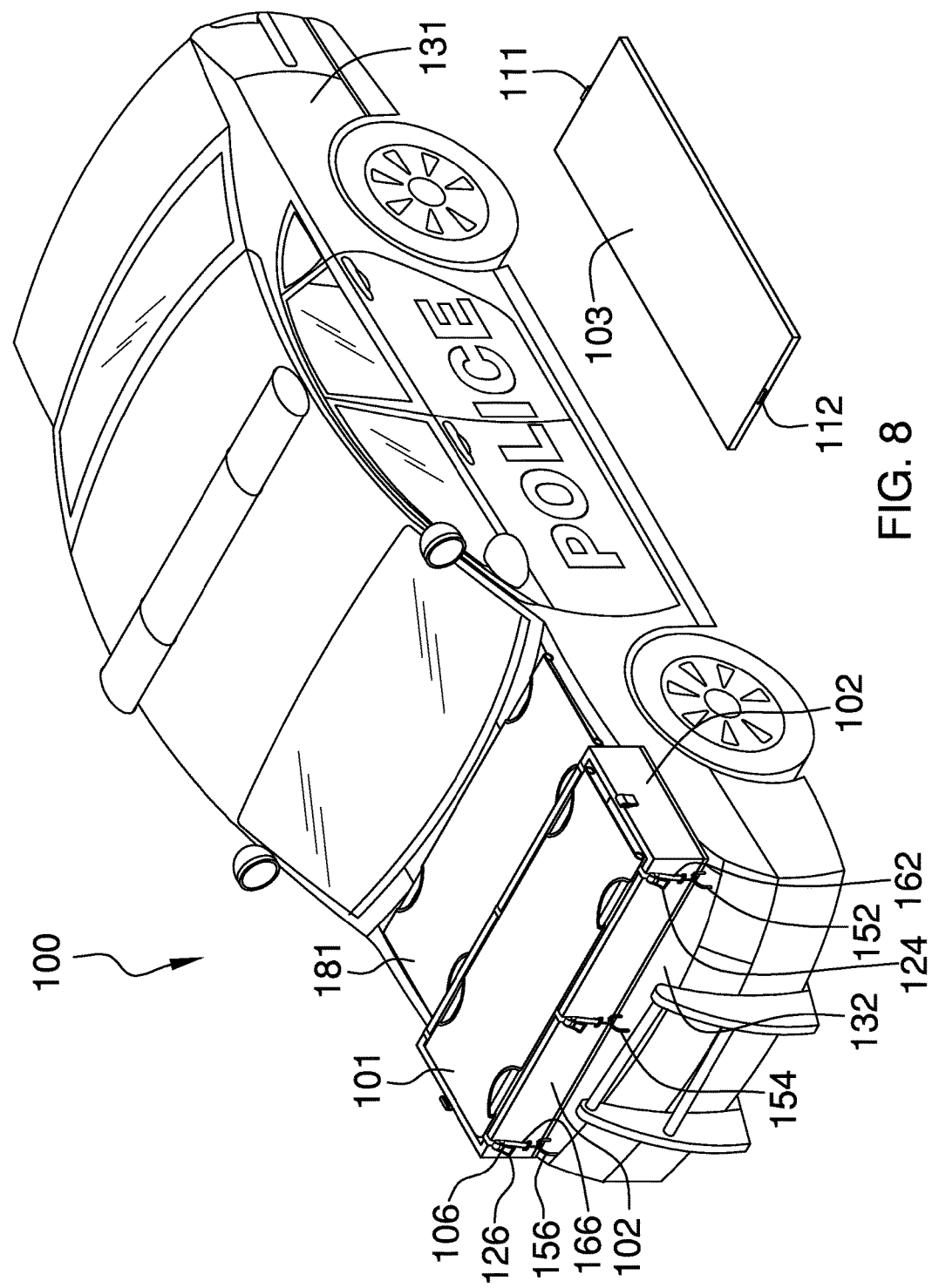
FIG. 8 is a view of a different alternative embodiment of the disclosure.

Referring to FIG. 8 depicts another configuration of use of the invention 100 whereby the container 102 supports the stretcher 101, and a second stretcher 181 is attached adjacent to the container 102 and the stretcher 101. Moreover, the second stretcher 181 is adapted to be secured to the hood 132. The second stretcher 181 is aft of the stretcher 101 and the container 102 with respect to the hood 132 of the vehicle 131.

The following definitions were used in this disclosure:

Buckle: As used in this disclosure, a buckle is a fastening that is used for joining a first loose end of a strap to a second loose end of the same strap or a different strap. A buckle further comprises a male connector that is attached to a first loose end and a female connector that is attached to a second loose end. The male connector has a pin or other structure that is generally caught by a structure formed in the female connector.

Fastener: As used in this disclosure, a fastener is a device that is used to join or affix two objects. Fasteners generally comprise a first element, which is attached to the first object and a second element, which is attached to the second object such that the first element and the second element join to affix the first object and the second object.

Quick Release Buckle: As used in this disclosure, a quick release buckle is a specific type of buckle wherein the buckle can be readily and easily disconnected by pressing a button or pinching one of the ends of the quick release buckle. Quick release buckles are readily and commercially available.

Ring and Slider Arrangement: As used in this disclosure, a ring and slider arrangement is an apparatus comprising a ring component and a slider component that is used to adjust the effective length of a webbing in an application. In the ring and slider arrangement, an end of the webbing is inserted through the slider component, looped through the ring component and then reverse threaded through the slider component for a second time. By adjusting the position of the slider component relative to the webbing, the effective length of the webbing can be adjusted. Ring and slider arrangements are well known and documented in the textile arts.

Textile: As used in this disclosure, a textile is a material that is woven, knitted, braided or felted. Synonyms in common usage for this definition include fabric and cloth.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A transport device comprising:
a stretcher, a container, a removable lid, a plurality of anchors, a plurality of webbings, and a plurality of strain devices; wherein each strain device selected from the plurality of strain devices places a webbing selected from the plurality of webbings under tension such that each of the plurality of webbings will support the stretcher when the stretcher is placed on the container; wherein the lid can be reattached to the container above the webbing supported stretcher;
wherein the transport device is adapted for use with a vehicle;
wherein the transport device is adapted to secure the stretcher to the hood of the vehicle.

2. The transport device according to claim 1 wherein the container is a hollow rectangular structure that is sized to receive one or more stretchers for storage purposes.

3. The transport device according to claim 2 wherein the container is formed from bullet resistant material.

4. The transport device according to claim 3 wherein the bullet resistant material is a polycarbonate resin.

5. The transport device according to claim 4 wherein the container further comprises an open surface.

6. The transport device according to claim 5 wherein the lid is a rectangular plate that is sized to cover and close the open surface of the container.

7. The transport device according to claim 6 wherein the lid is formed from the same material as the container.

8. The transport device according to claim 7
wherein the lid is attached to the container using a first locking fastener and a second locking fastener;
wherein the first locking fastener and the second locking fastener are identical.

9. The transport device according to claim 8
wherein the first locking fastener further comprises a first positive locking device;
wherein the first locking fastener further comprises a second positive locking device.

10. The transport device according to claim 9
wherein the first positive locking device is a wire based locking mechanism;
wherein the second positive locking device is a wire based locking mechanism.

11. The transport device according to claim 9 wherein each of the plurality of anchors is a mooring device that is fastened to the hood of the vehicle such that each of the plurality of webbings can be fastened to one or more anchors selected from the plurality of anchors.

12. The transport device according to claim 11
wherein the plurality of webbings is a collection of individual webbings;
wherein each of the plurality of webbings secures the container to the hood of the vehicle;
wherein each of the plurality of webbings supports the stretcher when the stretcher is placed on the container.

13. The transport device according to claim 12
wherein each of the two ends of each webbing selected from the plurality of webbings are attached to each other using a strain device selected from the plurality of strain devices;
wherein each of the plurality of anchors is U bolt.

14. The transport device according to claim 13 wherein the plurality of anchors further comprises a first U bolt, a second U bolt, a third U bolt, a fourth U bolt, a fifth U bolt, and a sixth U bolt.

15. The transport device according to claim 14
wherein the plurality of webbings further comprises a first webbing, a second webbing, and a third webbing;
wherein the first webbing is further defined with a first end and a second end;
wherein the second webbing is further defined with a third end and a fourth end.

16. The transport device according to claim 15
wherein the plurality of strain devices further comprises a first strain device;
wherein the container is placed on top of the hood of the vehicle;
wherein the first webbing is threaded through the first U bolt and the second U bolt and placed on top of the container;
wherein the first end and the second end are then joined using the first strain device;
wherein tension is applied to the first webbing using the first strain device.

17. The transport device according to claim 16
wherein the plurality of strain devices further comprises a second strain device;
wherein the second webbing is threaded through the third U bolt and the fourth U bolt and placed on top of the container;
wherein the third end and the fourth end are then joined using the second strain device;

wherein tension is applied to the second webbing using the second strain device.

18. The transport device according to claim 17
wherein the plurality of strain devices further comprises a third strain device;
wherein the third webbing is threaded through the fifth U bolt and the sixth U bolt and placed on top of the container;
wherein the fifth end and the sixth end are then joined using the third strain device;
wherein tension is applied to the third webbing using the third strain device;
wherein the stretcher is placed on top of the container such that it is supported by the first webbing, the second webbing, and the third webbing;
wherein each of the plurality of strain devices is a quick release buckle with an associated ring and slider arrangement.

19. The transport device according to claim 18 wherein the container supports the stretcher, and a second stretcher is attached adjacent to the container and the stretcher; wherein the second stretcher is adapted to be secured to the hood; wherein the second stretcher is aft of the stretcher and the container with respect to the hood of the vehicle.

20. The transport device according to claim 18 wherein a rope is provided and is used in lieu of the stretcher and the container; wherein the rope extends across the second U bolt, the fourth U bolt, and the sixth U bolt; wherein the rope forms a barricade that is adapted to be supported via the vehicle and personnel.

* * * * *